United States Patent
Singh et al.

(10) Patent No.: US 7,088,545 B1
(45) Date of Patent: Aug. 8, 2006

(54) DISK DRIVE DECREASING HEAD TEMPERATURE TO INCREASE FLY-HEIGHT DURING SEEK OPERATION

(75) Inventors: Dalwinder Singh, Irvine, CA (US); Gregory B. Thelin, Garden Grove, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/168,274

(22) Filed: Jun. 28, 2005

(51) Int. Cl.
*G11B 21/02* (2006.01)
(52) U.S. Cl. ....................................................... 360/75
(58) Field of Classification Search ................ None
See application file for complete search history.

(56) References Cited

U.S. PATENT DOCUMENTS

| | | | |
|---|---|---|---|
| 4,777,544 A | 10/1988 | Brown et al. | |
| 5,377,058 A | 12/1994 | Good et al. | |
| 5,410,439 A | 4/1995 | Egbert et al. | |
| 5,831,781 A | 11/1998 | Okamura | |
| 5,909,330 A | 6/1999 | Carlson et al. | |
| 5,991,113 A | 11/1999 | Meyer et al. | |
| 6,034,837 A | 3/2000 | Purkett | |
| 6,249,393 B1 | 6/2001 | Billings et al. | |
| 6,388,413 B1 | 5/2002 | Ng et al. | |
| 6,493,171 B1 | 12/2002 | Enokida et al. | |
| 6,501,606 B1 | 12/2002 | Boutaghou et al. | |
| 6,577,466 B1 | 6/2003 | Meyer et al. | |
| 6,691,213 B1 | 2/2004 | Luu et al. | |
| 6,700,724 B1 | 3/2004 | Riddering et al. | |
| 6,728,054 B1 | 4/2004 | Chng et al. | |
| 6,775,089 B1 | 8/2004 | Bonin et al. | |
| 6,775,103 B1 * | 8/2004 | Kang et al. | 360/236.5 |
| 6,785,081 B1 | 8/2004 | Chapin et al. | |
| 6,848,019 B1 | 1/2005 | Mobley et al. | |
| 6,950,266 B1 * | 9/2005 | McCaslin et al. | 360/75 |
| 7,042,674 B1 * | 5/2006 | Baril et al. | 360/75 |
| 2002/0176208 A1 | 11/2002 | Serpe et al. | |
| 2003/0058559 A1 | 3/2003 | Brand et al. | |
| 2004/0075940 A1 | 4/2004 | Bajorek et al. | |
| 2004/0150904 A1 | 8/2004 | Schell et al. | |
| 2004/0190175 A1 | 9/2004 | Chey et al. | |
| 2004/0240109 A1 | 12/2004 | Hamann et al. | |
| 2005/0052773 A1 | 3/2005 | Suk | |
| 2005/0078566 A1 | 4/2005 | Wilson et al. | |

FOREIGN PATENT DOCUMENTS

WO    WO 02/19330 A1    3/2002

* cited by examiner

*Primary Examiner*—K. Wong
(74) *Attorney, Agent, or Firm*—Howard H. Sheerin, Esq.

(57) ABSTRACT

A disk drive is disclosed comprising a disk having a plurality of tracks, and a head actuated over the disk. Control circuitry heats the head in order to reduce a fly-height of the head, and computes a target servo sector to begin a preheat period. The control circuitry decreases the heat so that the fly-height is increased during at least part of a seek operation to seek the head from a first track to a second track. When the head reaches the target servo sector, the control circuitry increases the heat to decrease the fly-height during the preheat period.

27 Claims, 5 Drawing Sheets

DISK DRIVE DECREASING HEAD TEMPERATURE TO INCREASE FLY-HEIGHT DURING SEEK OPERATION

BACKGROUND OF THE INVENTION

1. Field of the Invention

The present invention relates to disk drives for computer systems. More particularly, the present invention relates to a disk drive decreasing head temperature to increase fly-height during seek operation.

2. Description of the Prior Art

In disk drives, a head is actuated radially over a disk in order to access a target track recorded on the disk. The head is attached to a distal end of an actuator arm which is rotated about a pivot by a voice coil motor during seek operations. As the disk rotates, an air bearing forms which causes the head to "fly" just above the disk surface while writing magnetic transitions during a write operation, or reading the magnetic transitions during a read operation. The head comprises a slider having an air bearing surface and an integrated transducer, such as a write coil and a magnetoresistive read element.

Decreasing the distance between the transducer and disk surface (fly-height) improves the signal-to-noise ratio in the read signal, thereby enabling higher recording densities (radial tracks per inch and linear bits per inch). To this end, designers have exploited the expansion properties of the head (e.g., the slider and/or transducer) by incorporating a heater to control the temperature of the head and thereby the fly-height. Increasing the temperature causes the head to expand, thereby moving the transducer closer to the disk surface. However, decreasing the fly-height increases the chances the head will collide with the disk causing damage to the head and or recording surface. This is of particular concern during seek operations due to the increased velocity of the head with respect to the disk and the potentially large fluctuations in fly-height due to vibrations in the actuator arm.

U.S. Pat. No. 5,991,113 discloses a disk drive which reduces the head temperature during a non-operating or "sleep" mode (not performing write or read operations), thereby increasing the fly-height to help prevent head/disk contract. However, the relatively slow transient response of the heater can adversely impact access time of the disk drive, particularly with respect to seek operations. For example, the cooling period of the heater can delay the seek operation, and the preheating period can delay the write/read operation after the seek.

There is, therefore, a need to reduce the head temperature to increase fly-height during seek operations without significantly increasing the access time of a disk drive.

SUMMARY OF THE INVENTION

An embodiment of the present invention comprises a disk drive comprising a disk having a plurality of tracks, and a head actuated over the disk. Control circuitry heats the head in order to reduce a fly-height of the head, and computes a target servo sector to begin a preheat period. The control circuitry decreases the heat so that the fly-height is increased during at least part of a seek operation to seek the head from a first track to a second track. When the head reaches the target servo sector, the control circuitry increases the heat to decrease the fly-height during the preheat period.

In one embodiment, the seek operation includes an acceleration time when the head accelerates toward the second track, and the heat is decreased prior to the acceleration time of the seek operation. In another embodiment, the heat is decreased during at least part of the acceleration time of the seek operation. In yet another embodiment, the acceleration time includes a first acceleration time when the head accelerates toward the second track at a first acceleration, and a second acceleration time when the head accelerates toward the second track at a second acceleration greater than the first acceleration, and the heat is decreased during at least part of the first acceleration time of the seek operation.

In another embodiment, the heat is increased during at least part of the acceleration time of the seek operation. In yet another embodiment, the seek operation includes a deceleration time when the head decelerates toward the second track, and the heat is increased during at least part of the deceleration time of the seek operation. In another embodiment, the seek operation includes a settle time when the head settles on the second track, and the heat is increased during at least part of the settle time of the seek operation.

In yet another embodiment, each track comprises a plurality of data sectors, the second track comprises at least one data sector associated with an access command, and the target servo sector is computed relative to the at least one data sector associated with the access command. In another embodiment, the target servo sector is computed relative to a reference servo sector associated with the end of the seek operation.

Another embodiment of the present invention comprises a method of operating a disk drive, the disk drive comprising a disk having a plurality of tracks, and a head actuated over the disk. The head is heated in order to reduce a fly-height of the head, and a target servo sector is computed to begin a preheat period. The heat is decreased so that the fly-height is increased during at least part of a seek operation to seek the head from a first track to a second track. When the head reaches the target servo sector, the heat is increased to decrease the fly-height during the preheat period.

Another embodiment of the present invention comprises a method of operating a disk drive, the disk drive comprising a disk having a plurality of tracks, and a head actuated over the disk. The head is heated in order to reduce a fly-height of the head, and a seek time is estimated to move the head from a first track to a second track during a seek operation. If the seek time is greater than a predetermined threshold, the heating of the head is controlled so that the fly-height is adjusted during at least part of the seek operation.

DESCRIPTION OF THE PREFERRED EMBODIMENTS

Figure 1A:
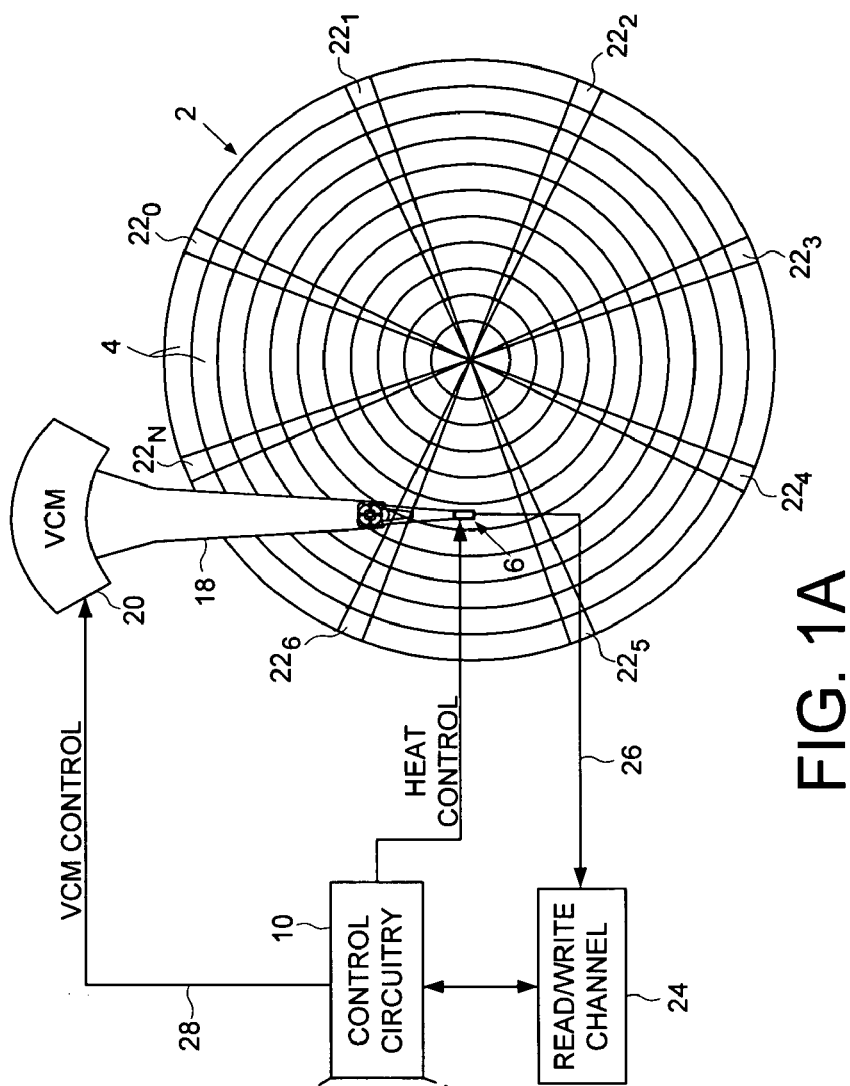
FIG. 1A shows a disk drive according to an embodiment of the present invention comprising a disk, and a head actuated over the disk, wherein the head is heated in order to decrease the fly-height.
Figure 1B:
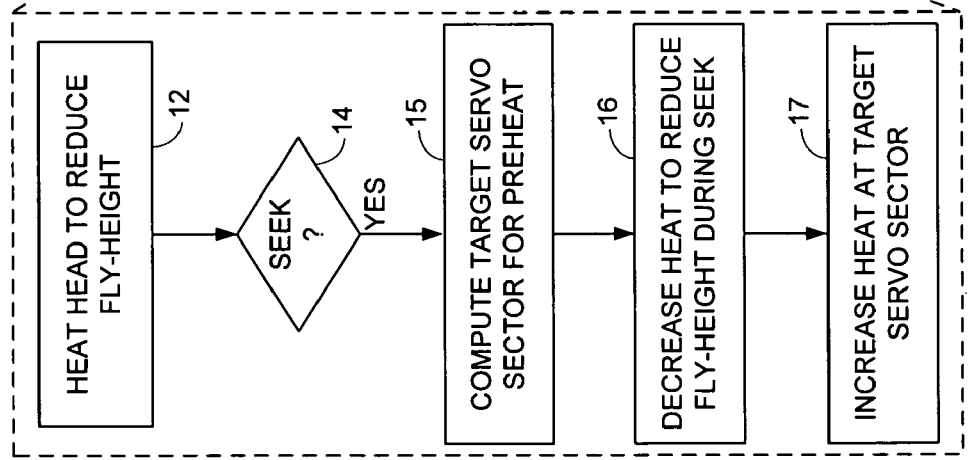
FIG. 1B is a flow diagram according to an embodiment of the present invention wherein the heat is decreased in order to increase the fly-height during at least part of a seek operation, and the heat then increased when the head reaches a target servo sector corresponding to a preheat period.

FIG. 1A shows a disk drive according to an embodiment of the presenting invention comprising a disk 2 having a plurality of tracks 4, and a head 6 actuated over the disk 2. The disk drive further comprises control circuitry 10 which executes the flow diagram of FIG. 1B wherein at step 12 the control circuitry 10 heats the head 6 in order to reduce a fly-height of the head 6. If at step 14 a seek operation is initiated to seek the head 6 from a first track to a second track, at step 15 the control circuitry 10 computes a target servo sector to begin preheating the head 6, and at step 16 the control circuitry 10 decreases the heat so that the fly-height is increased during at least part of the seek operation. When the head 6 reaches the target servo sector at step 17, the control circuitry 10 heats the head in order to decrease the fly-height during the preheat period.

Any suitable control circuitry 10 may be employed to implement the embodiments of the present invention. In one embodiment, the control circuitry 10 comprises a microprocessor executing instructions, the instructions being operable to cause the microprocessor to perform the steps of FIG. 1B as well as other functions described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk 2 and read into a volatile semiconductor memory when the disk drive is powered on. In yet another embodiment, the control circuitry 10 comprises suitable logic circuitry, such as state machine circuitry.

In the embodiment of FIG. 1A, the head 6 is connected to a distal end of an actuator arm 18 which is rotated about a pivot by a voice coil motor (VCM) 20 in order to actuate the head 6 radially over the disk 2. The VCM 20 comprises a voice coil which, when energized with current by the control circuitry 10, generates a magnetic flux which interacts with the magnetic flux from permanent magnets to generate a torque that rotates the actuator arm 18 about the pivot. Also in the embodiment of FIG. 1A, the disk 2 comprises a plurality of embedded servo sectors $22_0$–$22_N$ each comprising coarse head position information, such as a track address, and fine head position information, such as servo bursts. As the head 6 passes over each servo sector, a read/write channel 24 processes the read signal 26 emanating from the head 6 to demodulate the position information. The control circuitry 10 processes the position information to generate a control signal 28 applied to a voice coil motor (VCM) 20. The VCM 20 rotates the actuator arm 18 in order to position the head 6 over a target track during the seek operation, and maintains the head 6 over the target track during a tracking operation.

Figure 2A:
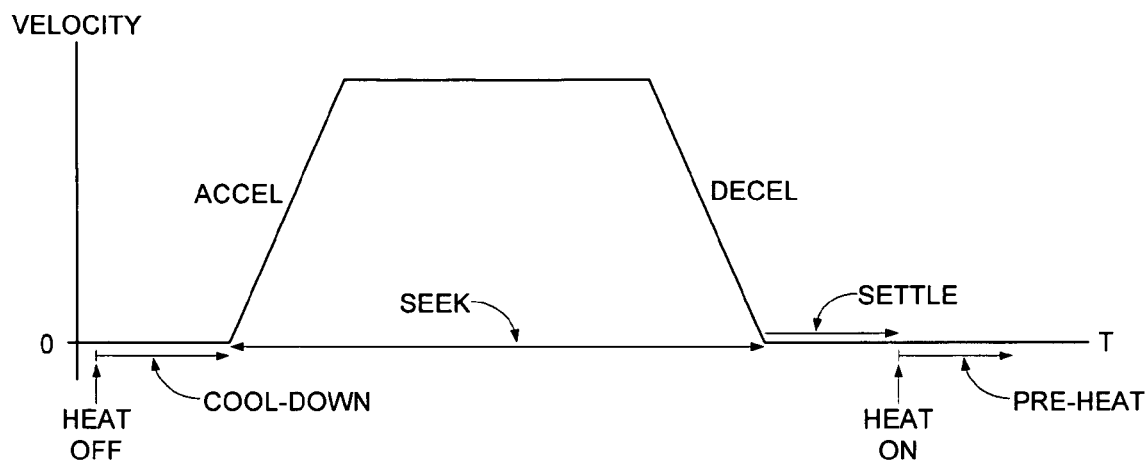
FIG. 2A shows a conventional seek profile wherein waiting for the head to cool down prior to a seek operation and waiting for the head to heat up after the settle time can increase the access time of the disk drive.

FIG. 2A shows a conventional seek profile comprising an acceleration time wherein the head 6 accelerates toward the target track, a deceleration time wherein the head 6 decelerates toward the target track, and a settle time wherein the head 6 settles onto the target track. Prior to the seek operation, the heat is turned on to heat the head 6 and thereby reduce the fly-height during read/write operations. When the control circuitry 10 performs a seek operation to seek the head 6 to a new target track, the heat is turned off in order to cool the head 6 and increase the fly-height to prevent head/disk contact. A cool-down delay period and a preheat period can increase the access time of the disk drive. This is illustrated in FIG. 2A wherein the cool-down period can result in a delay prior to starting the acceleration of the seek. In addition, the preheat period can delay the start of the next read/write operation if the heat is turned on after the settle time of the seek operation.

Figure 2B:
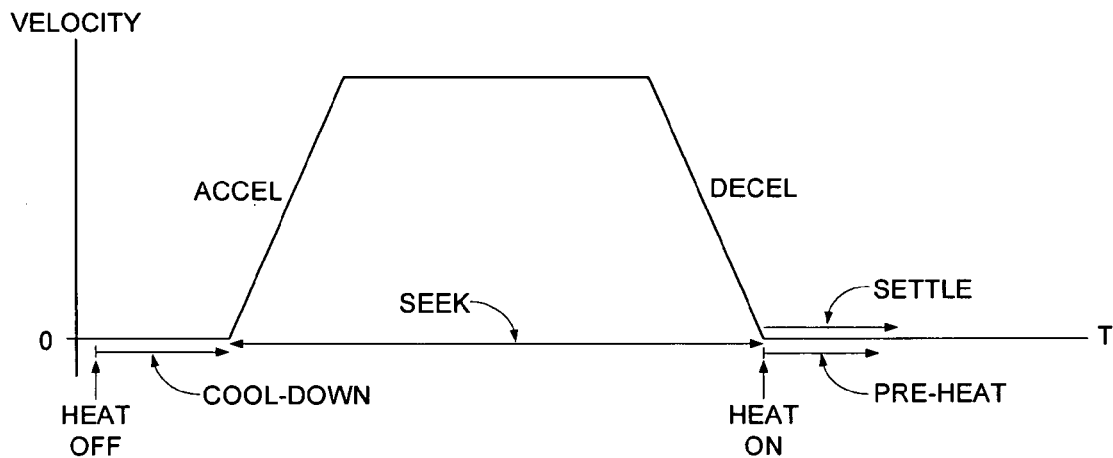
FIG. 2B shows an embodiment of the present invention wherein turning the heat on during at least part of the settle time prevents the preheat period from increasing the access time of the disk drive.

FIG. 2B shows an embodiment of the present invention wherein the control circuitry 10 turns the heat on during at least part of the settle time of the seek operation. In this manner, the delay of the preheat period is at least partially subsumed by the settle time thereby reducing (or eliminating) the delay in starting the next read/write operation. This embodiment may provide the best protection against head/disk contact since the fly-height is reduced while the head 6 is seeking across the disk 2 toward the target track.

Figure 2C:
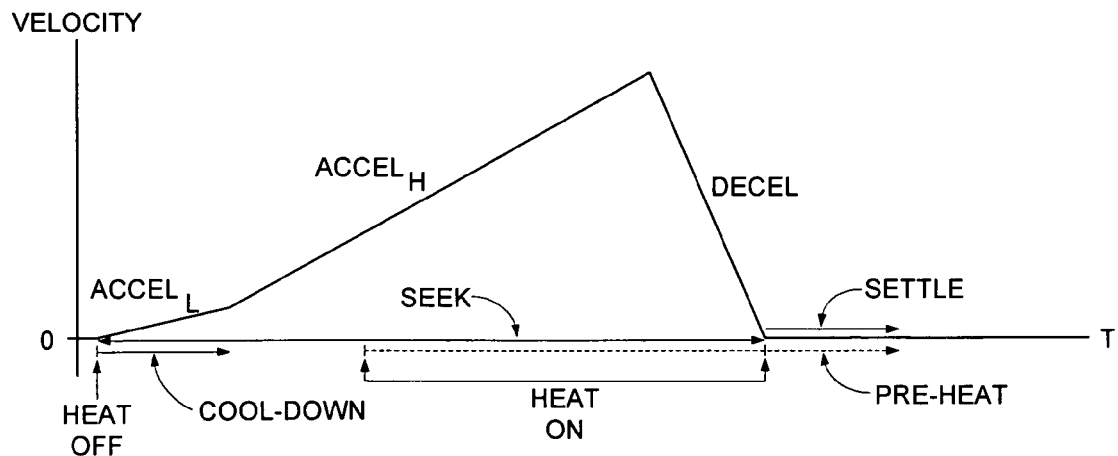
FIG. 2C shows an embodiment of the present invention wherein turning the heat off during a first acceleration time prevents the cool-down period from increasing the access time of the disk drive.

FIG. 2C shows another embodiment of the present invention wherein the control circuitry 10 turns the heat on during at least part of the acceleration time, the deceleration time, or the settle time. This embodiment compensates for a longer preheat period that exceeds the settle time, that is, by preheating the head 6 during the acceleration or deceleration times in addition to the settle time. FIG. 2C also shows an embodiment of the present invention wherein the acceleration time includes a first acceleration time ($ACCEL_L$) when the head 6 accelerates toward the target track at a first acceleration, and a second acceleration time ($ACCEL_H$) when the head 6 accelerates toward the target track at a second acceleration greater than the first acceleration. The control circuitry 10 decreases the heat during at least part of the first acceleration time of the seek operation to increase the fly-height while the head 6 is accelerating less aggressively ($ACCEL_L$) to help prevent head/disk contact. The acceleration is then increased ($ACCEL_H$) after the fly-height has increased sufficiently (after the cool-down period) which allows the head 6 to move faster.

In another embodiment, the control circuitry 10 does not adjust the heat if an estimated seek time for the seek operation is less than a predetermined threshold, for example, if the estimated seek time is less than the delay of the cool-down and preheat periods. This embodiment is illustrated in the flow diagram of FIG. 3 wherein if at step 30 a seek operation is initiated, at step 32 the control circuitry 10 estimates a seek time by evaluating the seek and rotational latency relative to the target track of the next command. At step 34 the control circuitry 10 selects an appropriate seek profile in response to the estimated seek time. If at step 36 the estimated seek time is less than the predetermined threshold, then the control circuitry 10 does not adjust the seek profile or turn off the heat, but instead accelerates the head 6 at step 54 according to a normal acceleration profile. If at step 36 the estimated seek time is greater than a predetermined threshold, then at step 38 the seek profile selected at step 34 is adjusted similar to FIG. 2C.

At step 40 the heat is turned off and at step 42 the control circuitry 10 begins accelerating the head 6 toward the target track at $ACCEL_L$ for a first acceleration time to allow the head 6 to cool and the fly-height to increase. After the first acceleration time, at step 44 the control circuitry 10 increases the acceleration to $ACCEL_H$ for a second acceleration time. At step 46 the control circuitry 10 decelerates the head 6 toward the target track for a deceleration time, and then at step 48 waits for a settle time for the head 6 to settle onto the target track. During the acceleration time, deceleration time, and settle time, the servo sectors 22 passing under the head 6 are monitored at step 50, and when the head 6 reaches the target servo sector $22_i$ corresponding to the preheat period, the heat is turned back on at step 52 to preheat the head 6 and decrease the fly-height.

Figure 4A:
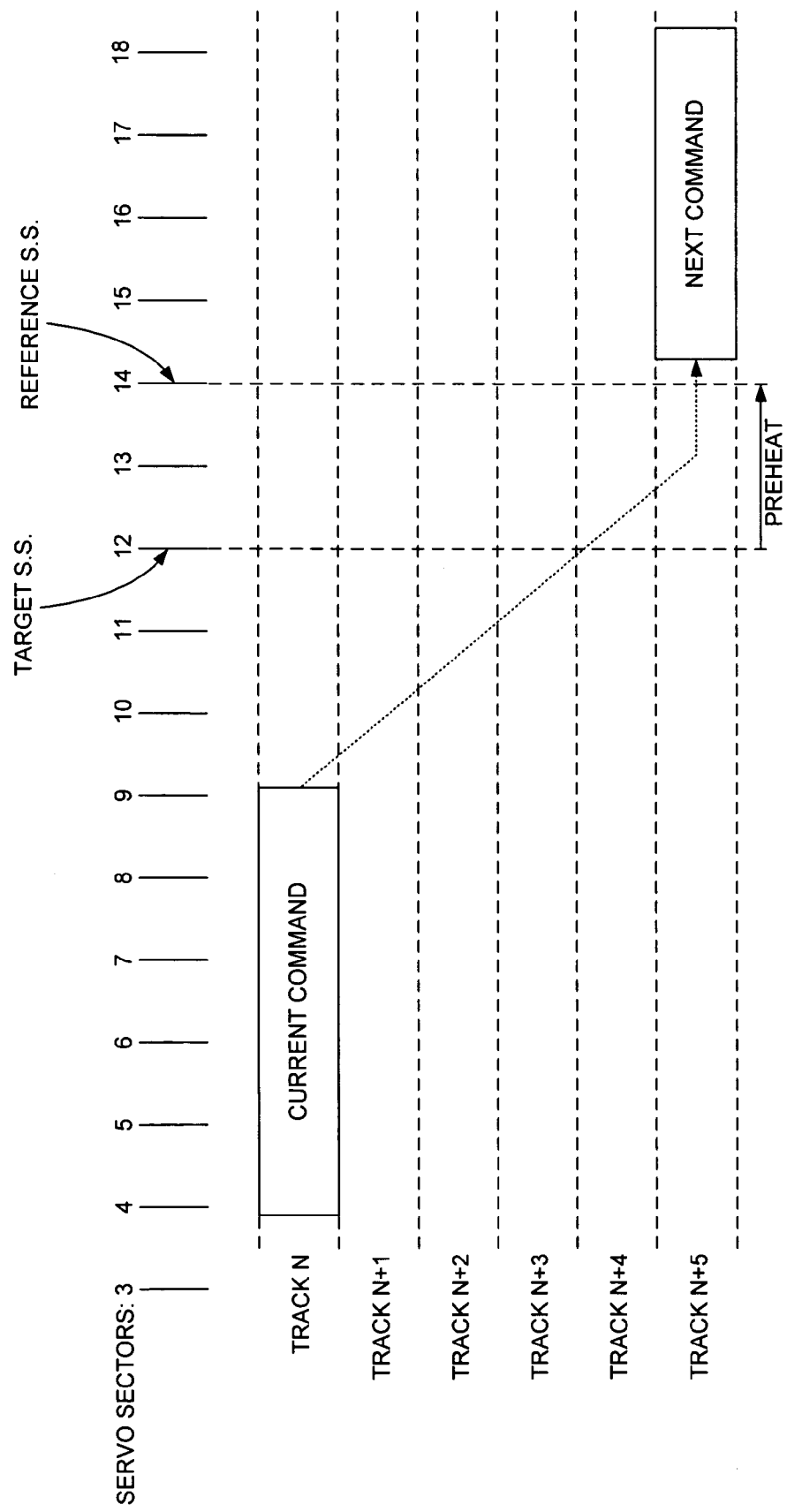
FIG. 4A illustrates an embodiment of the present invention wherein the target servo sector to begin the preheat period is computed relative to the first data sector of the next read/write command.

In one embodiment, the control circuitry 10 computes the target servo sector to begin preheating the head 6 relative to the first data sector of the next read/write command. This is illustrated in FIG. 4A wherein when the control circuitry 10 finishes executing a current command at track N, the control circuitry 10 executes a seek operation to seek the head 6 to a next command at track N+5. Prior to executing the seek operation, the control circuitry 10 evaluates the next command to determine the circumferential location of the first data sector in the next command. In the example shown in FIG. 4A, the first data sector of the next command occurs after the $14^{th}$ servo sector, and the target servo sector to begin the preheat period is computed relative to this reference servo sector. In the example of FIG. 4A, the preheat period takes two servo sectors, and therefore the $12^{th}$ servo sector is computed as the target servo sector to being the preheat period.

Figure 4B:
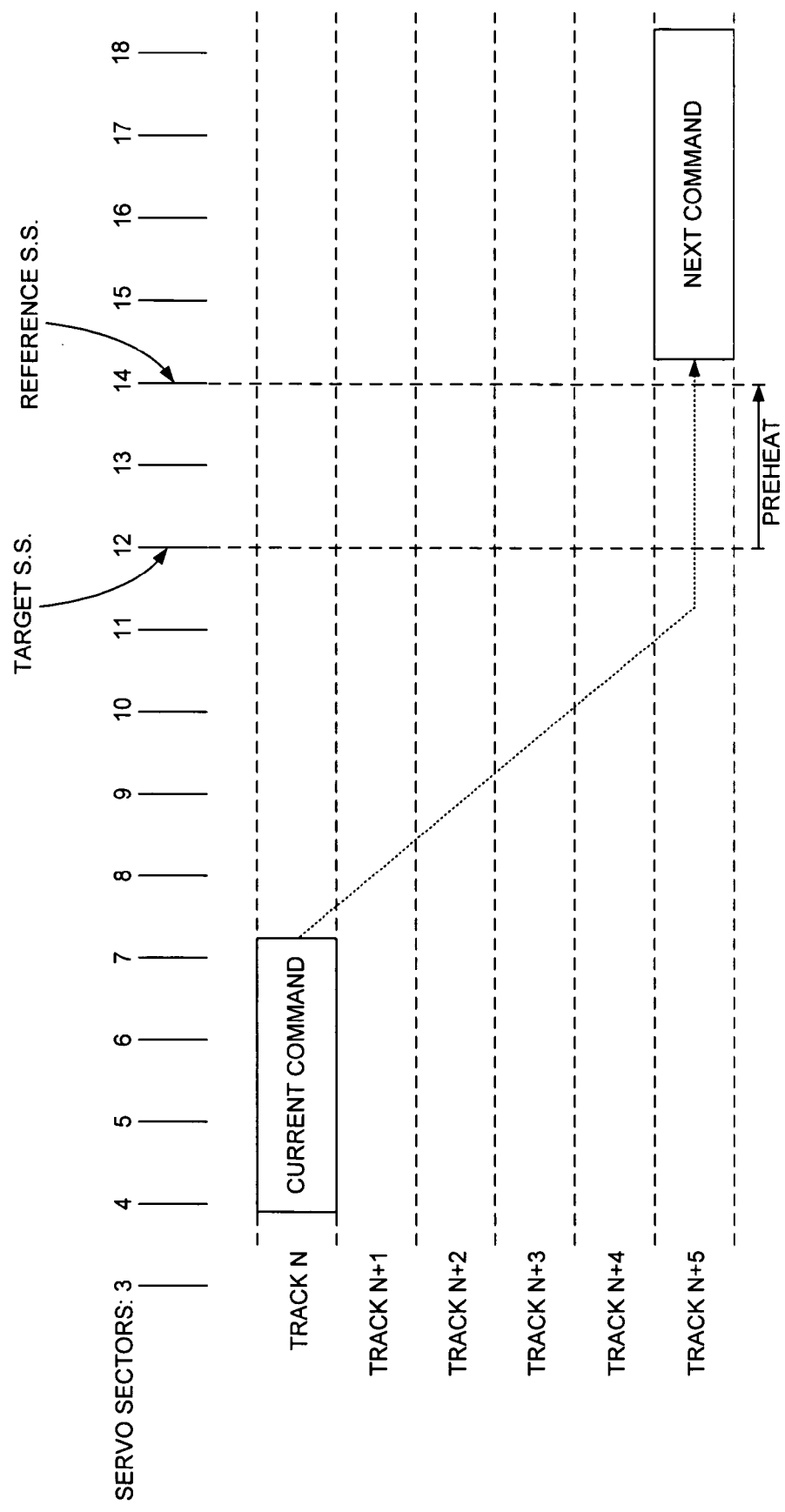
FIG. 4B illustrates an embodiment of the present invention wherein the preheat period overlaps with a rotational latency associated with the next command.

In an embodiment illustrated in FIG. 4B, the preheat period may overlap a rotational latency period prior to the head 6 reaching the first data sector of the next command. If so, the heat may be turned off (and the fly-height increased) during the entire seek operation to maximize protection against head/disk contact. In yet another embodiment, the control circuitry 10 may execute a pre-read operation during the rotational latency period in order to cache a number of data sectors preceding the next command. In this embodiment, the reference servo sector for computing the preheat period is selected relative to the seek profile and "best case" servo sector following the settle time of the seek operation. The "best case" servo sector following the settle time may vary depending on the capability of the VCM 20. That is, the capability of the VCM may vary from drive to drive, as well as with environmental conditions such as temperature, causing the head 6 to arrive and settle at different servo sectors on the target track. Selecting the "best case" or earliest possible servo sector (as determined from the seek profile) to compute the beginning of the preheat period ensures the head 6 will reach the target fly-height under all conditions.

Figure 3:
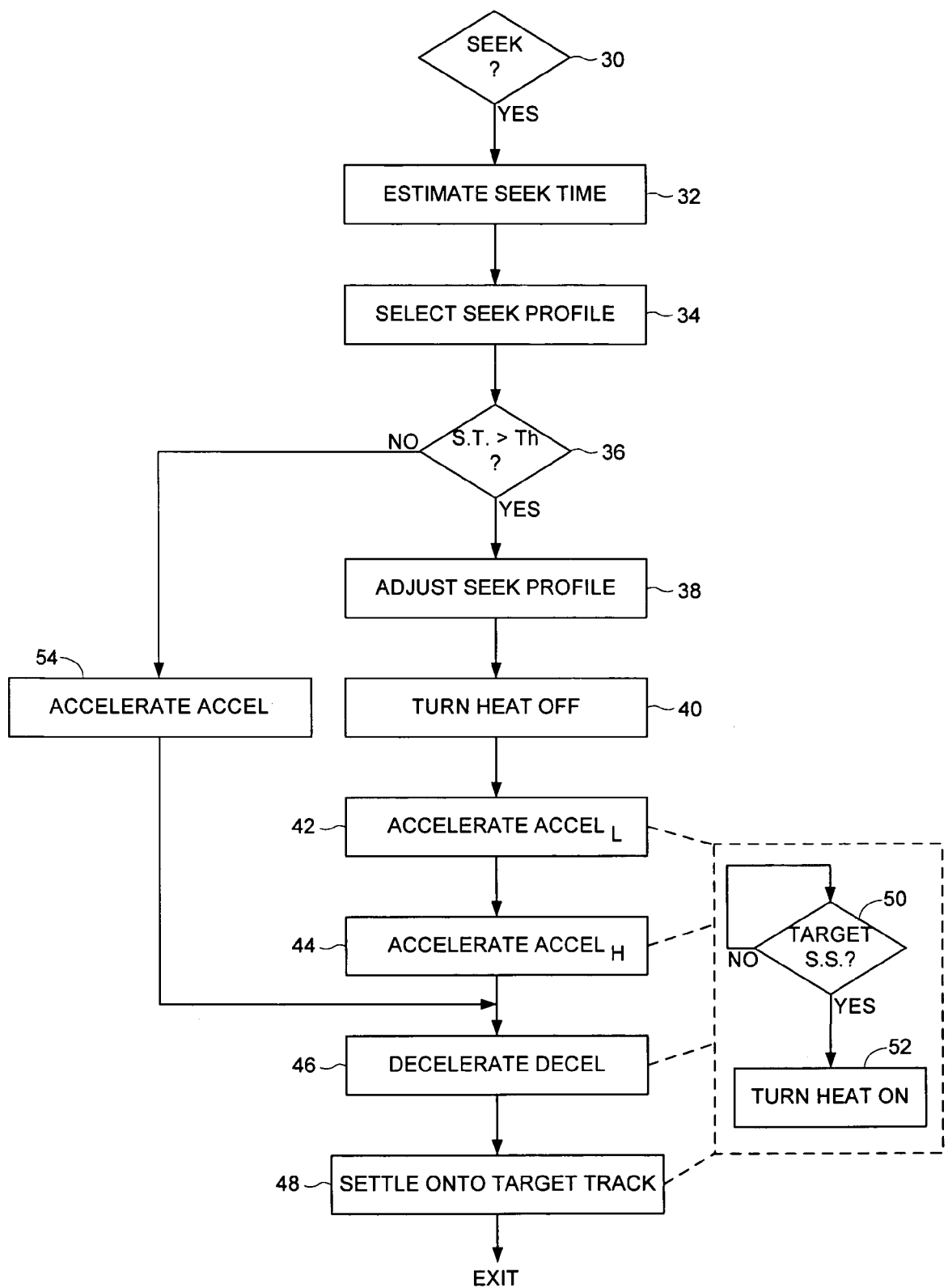
FIG. 3 is a flow diagram according to an embodiment of the present invention for controlling the heat according to FIG. 2C if an estimated seek time exceeds a predetermined threshold.

In one embodiment, the control circuitry 10 employs a separate preheat period (and corresponding target servo sector) at step 50 of FIG. 3 depending on whether the next command is a write command or read command. If the next command is a write command, the control circuitry 10 turns the heat on sooner to ensure the fly-height reduces to an acceptable level prior to writing data to the disk. If the next command is a read command, the control circuitry 10 turns the heat on later to help protect against head/disk contact during the seek operation by waiting longer to decrease the fly-height. Read errors due to excessive fly-height are not as critical as write errors since the read errors may be corrected using ECC circuitry or through a retry operation.

In yet another embodiment, the preheat period at step 50 is adjusted over the life of the disk drive by measuring the transient response of the heating process. The transient response may be measured periodically during a calibration mode, for example, by performing a number of write/read commands of a test pattern using different preheat periods and measuring the corresponding bit error rate. Alternatively, the read signal may be evaluated by the control circuitry 10 to measure the fly-height using well known techniques.

Any suitable technique to heat the head 6 may be employed in the embodiments of the present invention, and the heat may expand/contract any suitable feature of the head 6. For example, in one embodiment the head 6 comprises a slider fabricated from a suitable material (e.g., ceramic) that incorporates a transducer, wherein the heat expands a feature of the slider, for example, by passing a current through a heating element incorporated into the slider. In an alternative embodiment, the transducer is fabricated with material that expands with temperature, wherein current passing through the transducer or through a heating element attached to the transducer expands the transducer to control the fly-height. In addition, the heating process may be implemented open loop or closed loop, for example, by evaluating the read signal as feedback. Still further, the heating may be implemented using any suitable algorithm, such as bang—bang control (on-off), or using any suitable polynomial. For example, the heat may be increased using a simple linear function to gradually reduce the fly-height as the head approaches the target track, and then saturate the heat during the settle time of the seek operation.

We claim:

1. A disk drive comprising:
   (a) a disk comprising a plurality of tracks, wherein each track comprises a plurality of servo sectors;
   (b) a head actuated over the disk; and
   (c) control circuitry operable to:
      heat the head in order to reduce a fly-height of the head;
      compute a target servo sector to begin a preheat period;
      decrease the heat so that the fly-height is increased during at least part of a seek operation to seek the head from a first track to a second track; and
      when the head reaches the target servo sector, increase the heat to decrease the fly-height during the preheat period.

2. The disk drive as recited in claim 1, wherein:
   (a) the seek operation includes an acceleration time when the head accelerates toward the second track; and
   (b) the control circuitry is operable to decrease the heat prior to the acceleration time of the seek operation.

3. The disk drive as recited in claim 1, wherein:
   (a) the seek operation includes an acceleration time when the head accelerates toward the second track; and
   (b) the control circuitry is operable to decrease the heat during at least part of the acceleration time of the seek operation.

4. The disk drive as recited in claim 3, wherein:
   (a) the acceleration time includes a first acceleration time when the head accelerates toward the second track at a first acceleration;
   (b) the acceleration time includes a second acceleration time when the head accelerates toward the second track at a second acceleration greater than the first acceleration; and
   (c) the control circuitry is operable to decrease the heat during at least part of the first acceleration time of the seek operation.

5. The disk drive as recited in claim 1, wherein:
(a) the seek operation includes an acceleration time when the head accelerates toward the second track; and
(b) the control circuitry is operable to increase the heat during at least part of the acceleration time of the seek operation.

6. The disk drive as recited in claim 1, wherein:
(a) the seek operation includes a deceleration time when the head decelerates toward the second track; and
(b) the control circuitry is operable to increase the heat during at least part of the deceleration time of the seek operation.

7. The disk drive as recited in claim 1, wherein:
(a) the seek operation includes a settle time when the head settles on the second track; and
(b) the control circuitry is operable to increase the heat during at least part of the settle time of the seek operation.

8. The disk drive as recited in claim 1, wherein:
(a) each track comprises a plurality of data sectors;
(b) the second track comprises at least one data sector associated with an access command; and
(c) the target servo sector is computed relative to the at least one data sector associated with the access command.

9. The disk drive as recited in claim 1, wherein the target servo sector is computed relative to a reference servo sector associated with the end of the seek operation.

10. A method of operating a disk drive, the disk drive comprising a disk having a plurality of tracks each comprising a plurality of servo sectors, and a head actuated over the disk, the method comprising the steps of:
(a) heating the head in order to reduce a fly-height of the head;
(b) computing a target servo sector to begin a preheat period;
(c) decreasing the heat so that the fly-height is increased during at least part of a seek operation to seek the head from a first track to a second track; and
(d) when the head reaches the target servo sector, increasing the heat to decrease the fly-height during the preheat period.

11. The method as recited in claim 10, wherein:
(a) the seek operation includes an acceleration time when the head accelerates toward the second track; and
(b) the heat is decreased prior to the acceleration time of the seek operation.

12. The method as recited in claim 10, wherein:
(a) the seek operation includes an acceleration time when the head accelerates toward the second track; and
(b) the heat is decreased during at least part of the acceleration time of the seek operation.

13. The method as recited in claim 12, wherein:
(a) the acceleration time includes a first acceleration time when the head accelerates toward the second track at a first acceleration;
(b) the acceleration time includes a second acceleration time when the head accelerates toward the second track at a second acceleration greater than the first acceleration; and
(c) the heat is decreased during at least part of the first acceleration time of the seek operation.

14. The method as recited in claim 10, wherein:
(a) the seek operation includes an acceleration time when the head accelerates toward the second track; and
(b) the heat is increased during at least part of the acceleration time of the seek operation.

15. The method as recited in claim 10, wherein:
(a) the seek operation includes a deceleration time when the head decelerates toward the second track; and
(b) the heat is increased during at least part of the deceleration time of the seek operation.

16. The method as recited in claim 10, wherein:
(a) the seek operation includes a settle time when the head settles on the second track; and
(b) the heat is increased during at least part of the settle time of the seek operation.

17. The method as recited in claim 10, wherein:
(a) each track comprises a plurality of data sectors;
(b) the second track comprises at least one data sector associated with an access command; and
(c) the target servo sector is computed relative to the at least one data sector associated with the access command.

18. The method as recited in claim 10, wherein the target servo sector is computed relative to a reference servo sector associated with the end of the seek operation.

19. A method of operating a disk drive, the disk drive comprising a disk having a plurality of tracks, and a head actuated over the disk, the method comprising the steps of:
(a) heating the head in order to reduce a fly-height of the head;
(b) estimating a seek time to move the head from a first track to a second track during a seek operation; and
(c) if the seek time is greater than a predetermined threshold, controlling the heating of the head so that the fly-height is adjusted during at least part of the seek operation.

20. The method as recited in claim 19, wherein:
(a) the seek operation includes an acceleration time when the head accelerates toward the second track; and
(b) the heat is decreased prior to the acceleration time of the seek operation.

21. The method as recited in claim 19, wherein:
(a) the seek operation includes an acceleration time when the head accelerates toward the second track; and
(b) the heat is decreased during at least part of the acceleration time of the seek operation.

22. The method as recited in claim 21, wherein:
(a) the acceleration time includes a first acceleration time when the head accelerates toward the second track at a first acceleration;
(b) the acceleration time includes a second acceleration time when the head accelerates toward the second track at a second acceleration greater than the first acceleration; and
(c) the heat is decreased during at least part of the first acceleration time of the seek operation.

23. The method as recited in claim 19, wherein:
(a) the seek operation includes an acceleration time when the head accelerates toward the second track; and
(b) the heat is increased during at least part of the acceleration time of the seek operation.

24. The method as recited in claim 19, wherein:
(a) the seek operation includes a deceleration time when the head decelerates toward the second track; and
(b) the heat is increased during at least part of the deceleration time of the seek operation.

25. The method as recited in claim 19, wherein:
(a) the seek operation includes a settle time when the head settles on the second track; and (b) the heat is increased during at least part of the settle time of the seek operation.

26. The method as recited in claim 19, wherein:

(a) each track comprises a plurality of data sectors;

(b) the second track comprises at least one data sector associated with an access command; and (c) the target servo sector is computed relative to the at least one data sector associated with the access command.

27. The method as recited in claim 19, wherein the target servo sector is computed relative to a reference servo sector associated with the end of the seek operation.

* * * * *